United States Patent
Lee et al.

(10) Patent No.: US 7,620,769 B2
(45) Date of Patent: Nov. 17, 2009

(54) RECYCLING PARTIALLY-STALE FLASH BLOCKS USING A SLIDING WINDOW FOR MULTI-LEVEL-CELL (MLC) FLASH MEMORY

(75) Inventors: Charles C. Lee, Cupertino, CA (US);
Frank Yu, Palo Alto, CA (US);
Abraham C. Ma, Fremont, CA (US);
Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 460 days.

(21) Appl. No.: 11/674,645

(22) Filed: Feb. 13, 2007

(65) Prior Publication Data

US 2007/0268754 A1 Nov. 22, 2007

Related U.S. Application Data

(63) Continuation-in-part of application No. 11/466,759, filed on Aug. 23, 2006, now abandoned, and a continuation-in-part of application No. 10/789,333, filed on Feb. 26, 2004, now Pat. No. 7,318,117, and a continuation-in-part of application No. 09/478,720, filed on Jan. 6, 2000, now Pat. No. 7,257,714.

(51) Int. Cl.
*G06F 12/02* (2006.01)
(52) U.S. Cl. .................. 711/103; 711/156; 711/206
(58) Field of Classification Search ............... None
See application file for complete search history.

(56) References Cited

U.S. PATENT DOCUMENTS

| | | | |
|---|---|---|---|
| 5,581,723 A | | 12/1996 | Hasbun et al. |
| 5,682,497 A | | 10/1997 | Robinson |
| 5,778,392 A | | 7/1998 | Stockman et al. |
| 5,933,368 A | | 8/1999 | Ma et al. |
| 6,000,006 A | | 12/1999 | Bruce et al. |
| 6,038,636 A | | 3/2000 | Brown, III et al. |
| 6,282,605 B1 | * | 8/2001 | Moore ................... 711/103 |
| 6,622,199 B1 | | 9/2003 | Spall et al. |
| 2006/0149899 A1 | | 7/2006 | Zimmer et al. |
| 2006/0149913 A1 | | 7/2006 | Rothman et al. |
| 2006/0155922 A1 | * | 7/2006 | Gorobets et al. ............. 711/103 |
| 2007/0033332 A1 | * | 2/2007 | Sinclair et al. .............. 711/103 |

* cited by examiner

*Primary Examiner*—Than Nguyen
(74) *Attorney, Agent, or Firm*—Stuart T. Auvinen; g Patent LLC

(57) ABSTRACT

A sliding window of flash blocks is used to reduce wasted space occupied by stale data in a flash memory. The sliding window slides downward over a few flash blocks. The oldest block is examined for valid pages of data, and the valid pages are copied to the end of the sliding window so that the first block has only stale pages. The first block can then be erased and eventually re-used. A RAM usage table contains valid bits for pages in each block in the sliding window. A page's valid bit is changed from an erased, unwritten state to a valid state when data is written to the page. Later, when new host data replaces that data, the old page's valid bit is set to the stale state. A RAM stale-flags table keeps track of pages that are full of stale pages.

20 Claims, 14 Drawing Sheets

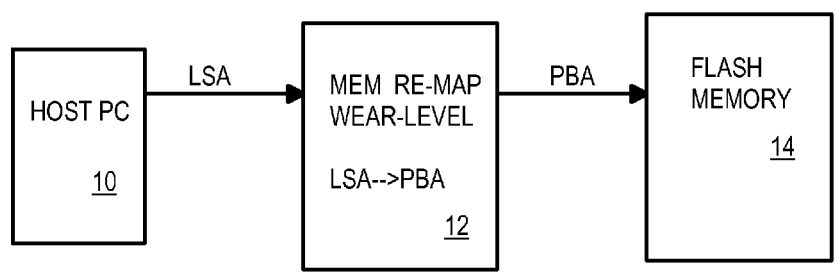

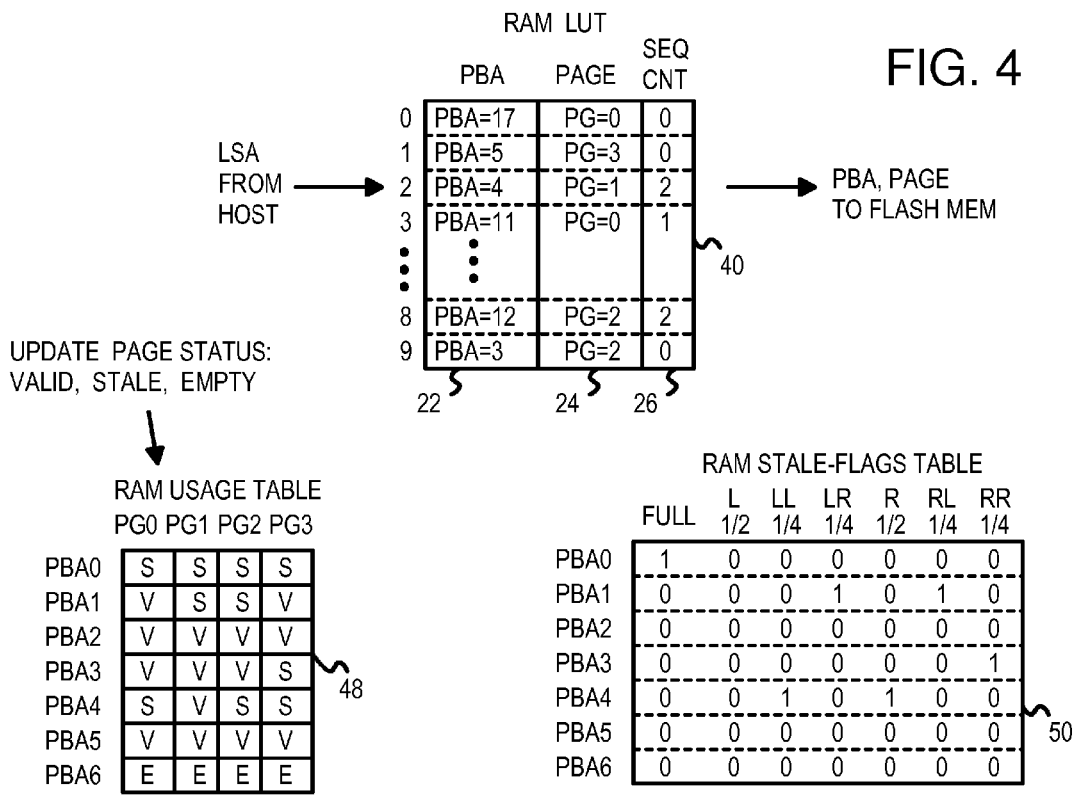

| LSA INDX | PBA | PAGE | SEQ CNT |
|---|---|---|---|
| 0 | | | |
| 1 | 0 | 0 | 0 |
| 2 | | | |
| 3 | 0 | 1 | 0 |
| 4 | | | |
| 5 | 0 | 2 | 0 |
| 6 | | | |
| 7 | 0 | 3 | 0 |
| 8 | | | |
| 9 | | | |
| 10 | | | |
| 11 | 1 | 0 | 1 |
| 12 | 1 | 3 | 1 |
| 13 | 1 | 1 | 1 |
| 14 | | | |
| 15 | 1 | 2 | 1 |

40

RAM USAGE TABLE

| | PG0 | PG1 | PG2 | PG3 |
|---|---|---|---|---|
| PBA0 | V | V | V | V |
| PBA1 | V | V | V | V |
| PBA2 | | | | |
| PBA3 | | | | |
| PBA4 | | | | |
| PBA5 | | | | |
| PBA6 | | | | |

| LSA INDX | PBA | PAGE | SEQ CNT |
|---|---|---|---|
| 0 | | | |
| 1 | 0 | 0 | 0 |
| 2 | | | |
| 3 | 0 | 1 | 0 |
| 4 | | | |
| 5 | 0 | 2 | 0 |
| 6 | | | |
| 7 | 0-->2 | 3-->0 | 0->2 |
| 8 | | | |
| 9 | | | |
| 10 | | | |
| 11 | 1 | 0 | 1 |
| 12 | 1 | 3 | 1 |
| 13 | 1 | 1 | 1 |
| 14 | | | |
| 15 | 1 | 2 | 1 |

40

RAM USAGE TABLE

| | PG0 | PG1 | PG2 | PG3 |
|---|---|---|---|---|
| PBA0 | V | V | V | V->S |
| PBA1 | V | V | V | V |
| PBA2 | V | | | |
| PBA3 | | | | |
| PBA4 | | | | |
| PBA5 | | | | |
| PBA6 | | | | |

|  LSA INDX | PBA | PAGE | SEQ CNT |
|---|---|---|---|
| 0 | | | |
| 1 | 0 | 0 | 0 |
| 2 | | | |
| 3 | 0 | 1 | 0 |
| 4 | | | |
| → 5 | 0-->2 | 2-->1 | 0->2 |
| 6 | | | |
| 7 | 2 | 0 | 2 |
| 8 | | | |
| 9 | | | |
| 10 | | | |
| 11 | 1 | 0 | 1 |
| 12 | 1 | 3 | 1 |
| 13 | 1 | 1 | 1 |
| 14 | | | |
| 15 | 1 | 2 | 1 |

40

RAM USAGE TABLE

|  | PG0 | PG1 | PG2 | PG3 |
|---|---|---|---|---|
| PBA0 | V | V | S | S |
| PBA1 | V | V | V | V |
| PBA2 | V | V | | |
| PBA3 | | | | |
| PBA4 | | | | |
| PBA5 | | | | |
| PBA6 | | | | |

|  LSA INDX | PBA | PAGE | SEQ CNT |
|---|---|---|---|
| 0 | | | |
| 1 | 0 | 0 | 0 |
| 2 | | | |
| → 3 | 0-->2 | 1-->2 | 0->2 |
| 4 | | | |
| 5 | 2 | 1 | 2 |
| 6 | | | |
| 7 | 2 | 0 | 2 |
| 8 | | | |
| 9 | | | |
| 10 | | | |
| 11 | 1 | 0 | 1 |
| 12 | 1 | 3 | 1 |
| 13 | 1 | 1 | 1 |
| 14 | | | |
| 15 | 1 | 2 | 1 |

40

RAM USAGE TABLE

|  | PG0 | PG1 | PG2 | PG3 |
|---|---|---|---|---|
| PBA0 | V | S | S | S |
| PBA1 | V | V | V | V |
| PBA2 | V | V | V | |
| PBA3 | | | | |
| PBA4 | | | | |
| PBA5 | | | | |
| PBA6 | | | | |

| LSA INDX | PBA | PAGE | SEQ CNT |
|---|---|---|---|
| 0 | | | |
| 1 → | 0-->2 | 0-->3 | 0->3 |
| 2 | | | |
| 3 | 2 | 2 | 2 |
| 4 | | | |
| 5 | 2 | 1 | 2 |
| 6 | | | |
| 7 | 2 | 0 | 2 |
| 8 | | | |
| 9 | | | |
| 10 | | | |
| 11 | 1 | 0 | 1 |
| 12 | 1 | 3 | 1 |
| 13 | 1 | 1 | 1 |
| 14 | | | |
| 15 | 1 | 2 | 1 |

~40

RAM USAGE TABLE
| | PG0 | PG1 | PG2 | PG3 |
|---|---|---|---|---|
| PBA0 | (S) | S | S | S |
| PBA1 | V | V | V | V |
| PBA2 | V | V | V | (V) |
| PBA3 | | | | |
| PBA4 | | | | |
| PBA5 | | | | |
| PBA6 | | | | |

ERASE STALE PBA0
↓
SLIDE DOWN WINDOW

| LSA INDX | PBA | PAGE | SEQ CNT |
|---|---|---|---|
| 0 | | | |
| 1 | 2 | 3 | 3 |
| 2 | | | |
| 3 | 2 | 2 | 2 |
| 4 | | | |
| 5 | 2 | 1 | 2 |
| 6 | | | |
| 7 | 2 | 0 | 2 |
| 8 | | | |
| 9 | | | |
| 10 | | | |
| 11 | 1 | 0 | 1 |
| 12 → | 1-->3 | 3-->0 | 1->3 |
| 13 | 1 | 1 | 1 |
| 14 | | | |
| 15 | 1 | 2 | 1 |

~40

RAM USAGE TABLE
| | PG0 | PG1 | PG2 | PG3 |
|---|---|---|---|---|
| PBA0 | S | S | S | S |
| PBA1 | V | V | V | (S) |
| PBA2 | V | V | V | V |
| PBA3 | (V) | | | |
| PBA4 | | | | |
| PBA5 | | | | |
| PBA6 | | | | |

| LSA INDX | PBA | PAGE | SEQ CNT |
|---|---|---|---|
| 0 | | | |
| → 1 | 2-->3 | 3 | 3 |
| 2 | | | |
| 3 | 2 | 2 | 2 |
| 4 | | | |
| 5 | 2 | 1 | 2 |
| → 6 | 3 | 2 | 3 |
| 7 | 2 | 0 | 2 |
| 8 | | | |
| 9 | | | |
| 10 | | | |
| 11 | 1 | 0 | 1 |
| 12 | 3 | 0 | 3 |
| 13 | 1 | 1 | 1 |
| → 14 | 3 | 1 | 3 |
| 15 | 1 | 2 | 1 |

40

RAM USAGE TABLE

| | PG0 | PG1 | PG2 | PG3 |
|---|---|---|---|---|
| PBA0 | S | S | S | S |
| PBA1 | V | V | V | S |
| PBA2 | V | V | V | S |
| PBA3 | V | V | V | V |
| PBA4 | | | | |
| PBA5 | | | | |
| PBA6 | | | | |

| LSA INDX | PBA | PAGE | SEQ CNT |
|---|---|---|---|
| 0 | | | |
| 1 | 3 | 3 | 3 |
| 2 | | | |
| 3 | 2 | 2 | 2 |
| 4 | | | |
| 5 | 2 | 1 | 2 |
| 6 | 3 | 2 | 3 |
| 7 | 2 | 0 | 2 |
| 8 | | | |
| 9 | | | |
| 10 | | | |
| 11 | 1 | 0 | 1 |
| → 12 | 3-->4 | 0 | 3->4 |
| 13 | 1 | 1 | 1 |
| 14 | 3 | 1 | 3 |
| 15 | 1 | 2 | 1 |

40

RAM USAGE TABLE

| | PG0 | PG1 | PG2 | PG3 |
|---|---|---|---|---|
| PBA0 | S | S | S | S |
| PBA1 | V | V | V | S |
| PBA2 | V | V | V | S |
| PBA3 | S | V | V | V |
| PBA4 | V | | | |
| PBA5 | | | | |
| PBA6 | | | | |

|  | LSA INDX | PBA | PAGE | SEQ CNT |
|---|---|---|---|---|
|  | 0 |  |  |  |
|  | 1 | 3 | 3 | 3 |
|  | 2 |  |  |  |
| → | 3 | 2→4 | 2→1 | 2→4 |
|  | 4 |  |  |  |
| → | 5 | 2→4 | 1→2 | 2→4 |
|  | 6 | 3 | 2 | 3 |
|  | 7 | 2 | 0 | 2 |
|  | 8 |  |  |  |
|  | 9 |  |  |  |
|  | 10 |  |  |  |
|  | 11 | 1 | 0 | 1 |
|  | 12 | 4 | 0 | 4 |
|  | 13 | 1 | 1 | 1 |
|  | 14 | 3 | 1 | 3 |
|  | 15 | 1 | 2 | 1 |

40

RAM USAGE TABLE

|  | PG0 | PG1 | PG2 | PG3 |
|---|---|---|---|---|
| PBA0 | S | S | S | S |
| PBA1 | V | V | V | S |
| PBA2 | V | S | S | S |
| PBA3 | S | V | V | V |
| PBA4 | V | V | V |  |
| PBA5 |  |  |  |  |
| PBA6 |  |  |  |  |

|  | LSA INDX | PBA | PAGE | SEQ CNT |
|---|---|---|---|---|
|  | 0 |  |  |  |
|  | 1 | 3 | 3 | 3 |
|  | 2 |  |  |  |
|  | 3 | 4 | 1 | 4 |
|  | 4 |  |  |  |
|  | 5 | 4 | 2 | 4 |
|  | 6 | 3 | 2 | 3 |
| → | 7 | 2→4 | 0→3 | 2→4 |
|  | 8 |  |  |  |
|  | 9 |  |  |  |
|  | 10 |  |  |  |
|  | 11 | 1 | 0 | 1 |
|  | 12 | 4 | 0 | 4 |
|  | 13 | 1 | 1 | 1 |
|  | 14 | 3 | 1 | 3 |
|  | 15 | 1 | 2 | 1 |

40

RAM USAGE TABLE

|  | PG0 | PG1 | PG2 | PG3 |
|---|---|---|---|---|
| PBA0 |  |  |  |  |
| PBA1 | V | V | V | S |
| PBA2 | S | S | S | S |
| PBA3 | S | V | V | V |
| PBA4 | V | V | V | V |
| PBA5 |  |  |  |  |
| PBA6 |  |  |  |  |

28
48

NEED TO SLIDE WINDOW DOWN

FIG. 5J

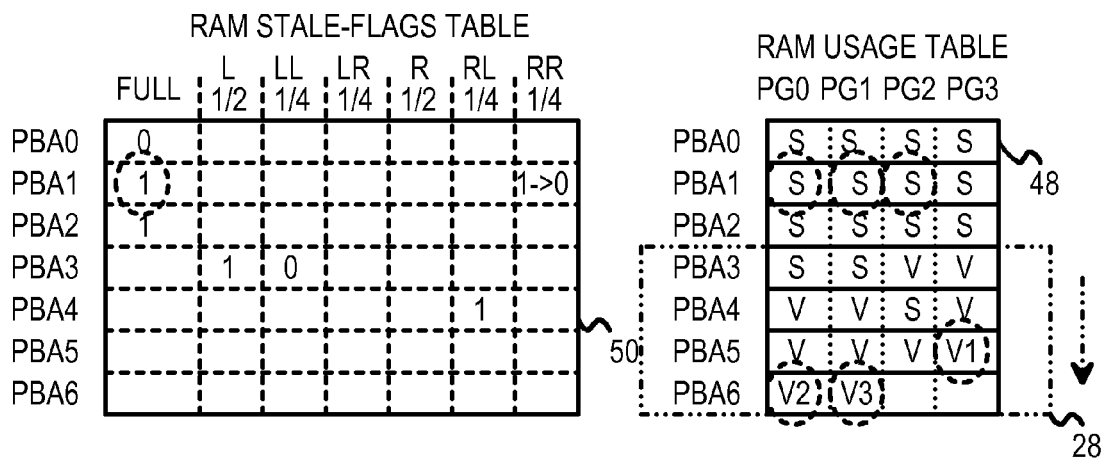
FIG. 6E  SLIDE WINDOW DOWN
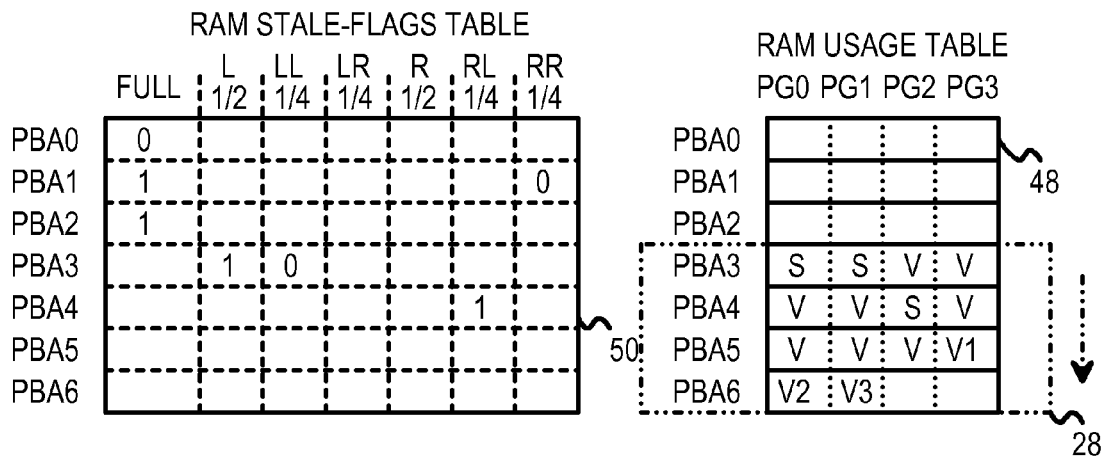
FIG. 6F  SLIDE WINDOW DOWN

US 7,620,769 B2

RECYCLING PARTIALLY-STALE FLASH BLOCKS USING A SLIDING WINDOW FOR MULTI-LEVEL-CELL (MLC) FLASH MEMORY

RELATED APPLICATION

This application is a continuation-in-part of the application for "Electronic Data Storage Medium with Fingerprint Verification Capability", U.S. Ser. No. 09/478,720, filed Jan. 6, 2000, and "Flash Memory Controller for Electronic Data Flash Card" U.S. Ser. No. 11/466,759, filed Aug. 23, 2006, which is a CIP of "System and Method for Controlling Flash Memory", U.S. Ser. No. 10/789,333, filed Feb. 26, 2004, now abandoned.

This application is related to "Flash memory device and architecture with multi level cells", U.S. Ser. No. 10/800,228, filed Mar. 12, 2004, now U.S. Pat. No. 7,082,056, and "Flash drive/reader with serial-port controller and flash-memory controller mastering a second RAM-buffer bus parallel to a CPU bus", U.S. Ser. No. 10/605,140, filed Sep. 10, 2003, now U.S. Pat. No. 6,874,044.

FIELD OF THE INVENTION

This invention relates to flash-memory solid-state-disk systems, and more particularly to flash-memory managers for relocating valid pages to reuse blocks with stale pages.

BACKGROUND OF THE INVENTION

Hard disk drives are commonly used in personal computers, servers, video recorders, and many other kind of electronic devices for mass storage. Mass storage is used to store large amounts of data that is typically copied to a faster random-access memory such as a dynamic-random-access memory (DRAM) for use by a processor. While the processor's DRAM is randomly accessible, mass storage is block-accessible. An entire block of data must be read or written from the mass storage device. A RAM may allow reading and writing of individual bytes or words of 4 or 8 bytes, while a mass storage device requires that a sector or 512 bytes or more be read or written together.

Flash memory may also be used as a mass storage device in lieu of a hard disk. Flash-memory arrays are also block-accessible, but have a much faster access time than rotating media such as a hard disk. However, since flash memory chips are block-addressable rather than randomly-accessible, flash is not as easy to use for a cache as DRAM or SRAM.

FIG. 1 shows a prior-art system using flash memory. Host PC 10 generates logical sector addresses (LSA) of a 512-byte block of data to be read or written from a mass storage device. Flash memory 14 can only be erased a block at a time. Flash memory manager 12 converts LSA logical addresses from host PC 10 into physical block addresses (PBA) that identify a physical block of data in flash memory 14. Flash memory manager 12 may use re-mapping tables to perform the address translation, and may perform other flash-related functions such as wear-leveling to spread erasures over blocks in flash memory 14. An erase count may be kept for each block in flash memory 14, and the block with the lowest erase count is selected to receive new data.

FIG. 2A shows blocks and pages within an older single-level-cell (SLC) flash memory. Older flash memory chips used electrically-erasable programmable read-only memory (EEPROM) memory cells that stored one bit of data per memory cell. While an entire block had to be erased together, pages within a block could be written and over-written several times. For example, block PBA0 contains stale data in pages PG0, PG1, PG2, PG3, and could be erased as a block. However, block PBA1 has stale data in pages PG0, PG3, while currently valid data is in pages PG1, PG2.

Some older single-level-cell flash memory chips may allow over-writing of pages that have previously been written. Then stale pages PG1, PG2 could be over-written with new valid data. Since flash memory manager 12 (FIG. 1) can remap LSA's to PBA's, any data could be stored in any page in flash memory 14, regardless of its logical address LSA. Thus physical blocks in flash memory 14 could be re-filled by over-writing stale pages with new data. Blocks with all stale pages could be erased and re-used.

FIG. 2B shows blocks and pages within a newer multi-level-cell (MLC) flash memory. Newer flash memory chips use EEPROM memory cells that stored two, four, or more bits of data per memory cell. Different amounts of charge stored on the floating gates produce different current and different sensing voltages for the same memory cell. Thus a single memory cell can store multiple bits of information by assigning different voltages to different logic levels. For example, sensing voltages near Vcc are read as a logic 11, voltages near ground are a logic 00, voltages above Vcc/2 and below 0.8*Vcc are a logic 10, and voltages below Vcc/2 but above 0.2*Vcc are a logic 01.

Multi-level-cell flash memory can store a higher density than single-level cell flash for the same cell size. Thus multi-level cell flash is likely to be used more frequently for higher-density flash chips made now and in the future. However, MLC flash chips may impose additional restrictions on usage. For example, a MLC flash chip may not allow pages to be written a second time before erase. Instead, the entire block must be erased before any page can be written again. Each page may be written only once after each erase. Alternately, some writing may be allowed, such as writing a 1 bit to a 0 bit, but other writes are not allowed, such as writing a 0 bit to a 1 bit. Some MLC flash chips may be even more restrictive, only allowing pages to be written in a sequence within a block, and not allowing pages to be written out-of-order.

In FIG. 2B, valid data was written to pages PG0, PG1, PG2, PG3 in blocks PBA1, PBA2, PBA3, but later pages PG1, PG2 in block PBA1 became stale as newer data was written to a newer block in flash memory 14. Pages PG1, PG2 in block PBA1 are marked as stale, while the data in these pages is left in the pages. Since there are still valid data in pages PG0, PG3 in block PBA1, block PBA1 cannot be erased yet. Half of the space in block PBA1 contains stale data, while half contains valid data. Other blocks may have more stale pages, such as block PBA2, which has 3 stale pages. However, the one page of valid data, page PG1, prevents block PBA2 from being erased and re-used.

Since the valid data may not be replaced for a long time, if ever, blocks may contain a mix of stale and valid pages. The stale pages are wasted space in flash memory 14. When these stale pages are in blocks with valid pages, the wasted space is not recovered and remains. The amount of stale pages per block varies, but can average 50%, resulting in perhaps 50% wasted space in flash memory 14 once all blocks are used. This wasted space is undesirable, since flash memory 14 may over time eventually use all blocks, with no erased blocks available for new data.

The limitations of newer MLC flash memory may thus result in more wasted space. Stale pages that cannot be over-written are wasted space when valid data in the same block is present.

What is desired is a flash memory manager for MLC flash memory. A flash memory manager that locates and re-uses blocks with stale pages is desirable.

BRIEF DESCRIPTION OF THE DRAWINGS

FIG. 1 shows a prior-art system using flash memory.

FIG. 2A shows blocks and pages within an older single-level-cell (SLC) flash memory.

FIG. 2B shows blocks and pages within a newer multi-level-cell (MLC) flash memory.

FIG. 4 highlights memory re-mapping using a RAM lookup table, and stale-page tracking using a RAM usage table and a RAM stale-flags table.

FIGS. 5A-5J show an example of flash-page writes updating the RAM lookup table and the RAM usage table.

FIGS. 6A-6F highlight changes in the RAM usage table and the RAM stale-flags table.

DETAILED DESCRIPTION

The present invention relates to an improvement in flash-memory managers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 3:
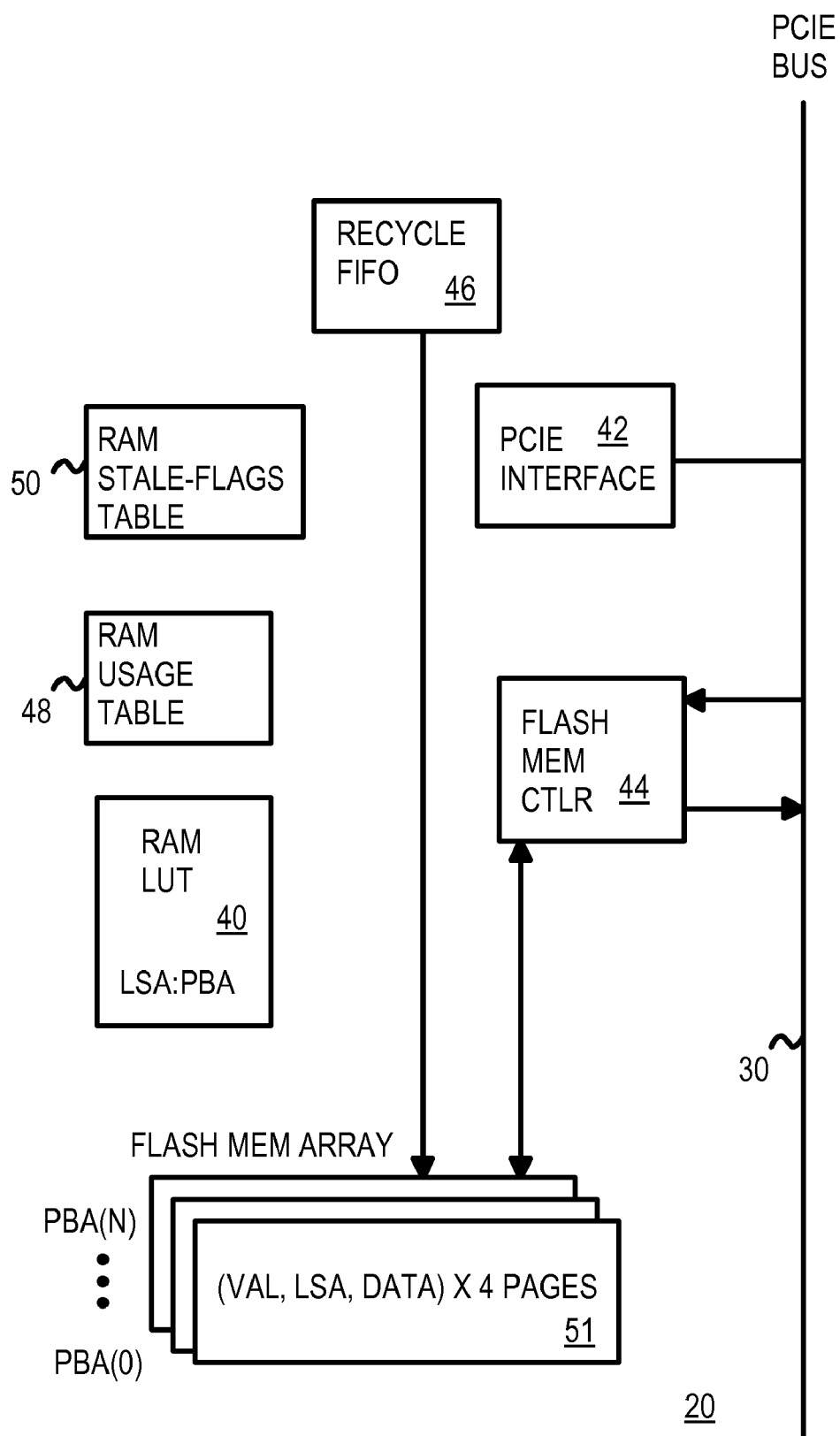
FIG. 3 is a block diagram of a flash-memory card.

FIG. 3 is a block diagram of a flash-memory card. Flash-memory card 20 connects to a host PC through an external I/O processor over PCIE bus 30. PCIE interface 42 generates packets and performs handshaking in response to commands received over PCIE bus 30.

The LSA sector address can be extracted from the command sent over PCIE bus 30. The LSA sector address is a logical address from host PC 10, rather than a physical address within a hard-disk or other mass-storage device. The LSA sector address can be looked up in RAM lookup table 40 to find the physical block address (PBA). The PBA is a physical address of a block of flash memory in flash-memory array 51.

RAM lookup table 40 stores LSA to PBA mappings for sectors in flash-memory array 51. RAM lookup table 40 provides a fast way to determine which PBA in flash-memory array 51 to access. Each PBA is divided into several pages, such as 4, 8, 64, or some other number. Each page holds one sector of data, and also stores the LSA for the data, and valid and stale bits. Flash memory controller 44 can look up the LSA in RAM lookup table 40 to find the PBA, then read the physical block for that PBA from flash-memory array 51. The LSA's for each page in that PBA are read and compared to the LSA from the host's request to determine if a match occurred. Flash-memory controller 44 then examines the page's valid bits to validate the match and reads or writes the data. Read data or a write response can be sent back to the host PC in a command or packet over PCIE bus 30.

RAM usage table 48 contains valid and stale bits for pages in flash-memory array 51. These valid and stale bits can be accessed and updated by flash memory controller 44, such as to mark as stale an old page of valid data that is being replaced by new write data in another page location in flash-memory array 51. New data written into an erased page has its valid bit set to valid, while all pages in a block being erased are marked as erased.

RAM stale-flags table 50 contains quarter, half, and full flags to indicate when a block has one-quarter, one-half, or is full of stale pages. RAM stale-flags table 50 is read and updated by flash memory controller 44 when performing memory management operations such relocating valid pages before erasing a block.

Recycle FIFO 46 contains a list of blocks that are being erased. The erase operation can be relatively slow. Several blocks may be in various stages of erasure, or may be waiting for erasure. Flash memory controller 44 adds an entry for a block to recycle FIFO 46 after any valid pages in the block have been relocated. After erasure is complete, the block's valid bits in RAM usage table 48 can be marked as erased.

FIG. 4 highlights memory re-mapping using a RAM lookup table, and stale-page tracking using a RAM usage table and a RAM stale-flags table. The host PC sends a read or write request to the flash-memory card (20 of FIG. 3). The request contains a LSA that logically identifies one of the 512-byte logical sectors in the flash memory.

The LSA selects one of the entries in RAM lookup table 40. In the example of FIG. 4, an LSA from the host of 12 is mapped to entry #2 in RAM lookup table 40. Entry #2 in RAM lookup table 40 indicates PBA 4 is the physical block that is mapped, while page PG1 contains the data. Entry #8 in RAM lookup table 40 indicates PBA 12 is the physical block that is mapped, while page PG2 contains the data. Other entries store mappings for other pages.

When more than one page maps to the same entry in RAM lookup table 40, additional PBA's and pages may be stored in that entry (not shown). A set-associative lookup in RAM lookup table 40 may be substituted, or other variations.

Each PBA has four pages, and each page stores 512 bytes of sector data, plus the LSA and valid bits for this sector data. The LSA from the page is read and compared to the incoming LSA from the host. If the page's LSA matches, and the page's valid bits are valid, the data can be returned to the host from that page for a read.

For a write, when a valid match occurs, the old sector data in the matching page becomes stale and is being replaced with new sector data from the host. The entire sector is replaced with new data since the hard disk is block-accessible rather than randomly-accessible. However, rather than over-writing the old page, the new data is written to the next free page that was recently erased. The old page with the old data is marked as stale in RAM usage table 48 and the old PBA is invalidated in RAM lookup table 40 while the new PBA and page is loaded into the matching entry.

Whether the LSA matched or did not match the valid pages in the PBA pointed to by the entry in RAM lookup table 40, the new sector data from the host can be written to an empty page in the PBA. The incoming LSA is also written to the empty page and the page's valid bits are set in the PBA and in RAM usage table 48.

Each entry in RAM lookup table 40 has a PBA field 22, a page field 24, and a sequential count field 26. Sequential count field 26 is updated with a new count when a new page is written into flash memory. The sequential count is periodically incremented, such as after each block is filled. Sequential count field 26 thus indicates how recently the page was written into flash memory. The sequential count can also be written to the overhead byes for a PBA in flash memory. Then when power fails, the sequential counts can be read and compared to determine which pages are the most recent, valid pages, and which pages are older, stale pages.

RAM usage table 48 stores a copy of valid bits for pages of flash memory. Each page can have its valid bit in one of three states. After the blocks has been erased, the valid bit is set to the erased (E) state. When new data is written into the page, the valid bit in RAM usage table 48 is set to valid V. When fresher data is written to another page in flash memory, the older data is marked stale by setting its valid bit to the stale (S) state.

RAM stale-flags table 50 contains stale flags that indicate when a block if full of stale pages, has one-half of the pages stale, or has one-quarter of the pages stale. Rather than indicating a count of half or one-quarter of the pages, the half and quarter flags indicate which half (right or left) and which of the four quadrants (LL, LR, RL, RR) contain all stale pages.

RAM stale-flags table 50 is useful for the flash memory manager when re-locating valid pages. Blocks of flash memory cannot be erased when one or more pages of valid data remain in that block, since the valid data would be erased. However, flash blocks that have only stale pages can safely be erased. The flash memory manager can quickly locate blocks with all stale pages by searching for full flags that are set in RAM stale-flags table 50. For example, blocks PBA0 has its full flags set to indicate that the block is full of stale pages and can safely be erased.

As pages are replaced and become stale, their valid bits in RAM usage table 48 are changed from valid to stale, and RAM stale-flags table 50 is updated to reflect the additional stale page. Alternately, RAM stale-flags table 50 can be updated periodically such as when a clean-up routine is activated, rather than after each page is replaced.

FIG. 5A-5J show an example of flash-page writes updating the RAM lookup table and the RAM usage table. In FIG. 5A, four logical sectors were written to flash and stored in block PBAO at pages 0, 1, 2, 3. The logical sectors are mapped by entries 1, 3, 5, 7 in RAM lookup table 40. The sequential count was 0 for all four pages, but was incremented to 1 for the next four pages, which were written to PBA1 at pages 0, 1, 2, 3, and are stored in entries 11, 13, 15, 12, respectively.

As the pages were written to flash, their valid bits in RAM usage table 48 were changed from erased to valid. The erased bits in RAM usage table 48 are not shown in this example to allow the valid and stale pages to stand out more clearly. Thus PBAO and PBA1 each have all four pages marked as valid in RAM usage table 48.

New pages are written to the next erased page within sliding window 28. Sliding window 28 points to four sequential blocks in flash memory. As pages fill up, sliding window 28 slides downward to the next erased block. Blocks that are full of stale pages are erased as they reach the top of sliding window 28. Since sliding window 28 loops through all available flash blocks, these erased blocks are eventually re-used during the next pass of sliding window 28.

Currently in FIG. 5A, sliding window 28 includes two flash blocks PBA0, PBA1 that are full of valid pages, and two more blocks PBA2, PBA3 that are full or erased pages. The next page from the host is written to the first page of block PBA2, page PG0, as shown in FIG. 5B. The host data is for the same logical address LSA as entry 7 of RAM lookup table 40, so the old page becomes stale. The old page was block PBA0, page 3, which has its valid bit changed from valid (V) to stale (S) in RAM usage table 48. The old page's PBA and page # are replaced in entry 7 in RAM lookup table 40 by the new page's PBA and page #, block PBA2, page PG0. The sequential count is incremented to 2 and written to entry 7 in RAM lookup table 40.

In FIG. 5C, a new page maps to entry 5 in RAM lookup table 40. The new LSA matches the old LSA, so the old page (PBA0, page 2) is marked stale in RAM usage table 48. Entry 5 in RAM lookup table 40 is replaced with the new PBA and page. Since the next free page in sliding window 28 is page 1 in block PBA2, PG1 overwrites the old entry 5 in RAM lookup table 40, along with the new sequential count of 2.

In FIG. 5D, a new page maps to entry 3 in RAM lookup table 40. The new LSA matches the old LSA, so the old page (PBAO, page 1) is marked stale in RAM usage table 48. Entry 3 in RAM lookup table 40 is replaced with the new PBA and page. Since the next free page in sliding window 28 is page 2 in block PBA2, PG3 overwrites the old entry 3 in RAM lookup table 40, along with the current sequential count of 2. Three of the pages in block PBA0 are now stale.

In FIG. 5E, a new page maps to entry 1 in RAM lookup table 40. The new LSA matches the old LSA, so the old page (PBA0, page 0) is marked stale in RAM usage table 48. Entry 1 in RAM lookup table 40 is replaced with the new PBA and page. Since the next free page in sliding window 28 is page 3 in block PBA2, PG3 overwrites the old entry 1 in RAM lookup table 40, along with the newly incremented sequential count of 3.

Since all four of the pages in block PBA0 are now stale, block PBA0 can safely be erased. Block PBA0 can be added to a recycle FIFO to be queued up for erasure. Sliding window 28 is slid down one row, and now covers the four blocks PBA1 to PBA4. Although flash-block-erase is a slow operation, once sliding window 28 loops back around to PBA0, erase of PBA0 will have time to complete.

In FIG. 5F, entry 12 is replaced. Old page PBA1, PG3 is marked stale in RAM usage table 48, while the new page is assigned to the next free page in sliding window 28, PBA3, PG0. Entry 12 is over-written with PBA3, PG0 and the current sequential count of 3.

In FIG. 5G, new logical sectors map to entries 6 and 15, which are empty entries in RAM lookup table 40. Since there are no old pages for these logical sectors, no pages are marked stale. The new pages are assigned to the next two free pages in sliding window 28, PBA3, pages PG1 and PG2. Their valid bits in RAM usage table 48 are set.

Also in FIG. 5G, entry 1 is replaced. Old page PBA2, PG3 is marked stale in RAM usage table 48, while the new page is assigned to the next free page in sliding window 28, PBA3, PG3 and its valid bit set in RAM usage table 48. Entry 1 is over-written with PBA3, PG0 and the current sequential count of 3.

In FIG. 5H, entry 12 is replaced. Old page PBA3, PG0 is marked stale in RAM usage table 48, while the new page is assigned to the next free page in sliding window 28, PBA4, PG0 and its valid bit set in RAM usage table 48. Entry 12 is over-written with PBA4, PG0 and the incremented sequential count of 4. Sliding window 28 cannot slide down since there are still 3 valid pages in the top row, PBA1.

In FIG. 5I, entries 3, 5 are replaced. Old pages PG1, PG2 in block PBA2 are marked stale in RAM usage table 48, while the new pages are assigned to the next free pages in sliding window 28, PG1, PG2 in PBA4, and their valid bits set in RAM usage table 48. Entries 3, 5 are over-written with PBA4, PG1, and PBA4, PG2, respectively, and the sequential count of 4. Sliding window 28 still cannot slide down since there are still 3 valid pages in the top row, PBA1.

In FIG. 5J, entry 7 is replaced. Old page PBA2, PG0 is marked stale in RAM usage table 48, while the new page is assigned to the next free page in sliding window 28, PBA4, PG3 and its valid bit set in RAM usage table 48. Entry 7 is over-written with PBA4, PG3 and the incremented sequential count of 4. Sliding window 28 still cannot slide down since there are still 3 valid pages in the top row, PBA1. However, block PBA2 can be erased since all of its pages are now stale. Sliding window 28 is now full and has no remaining free pages.

Figure 6A:
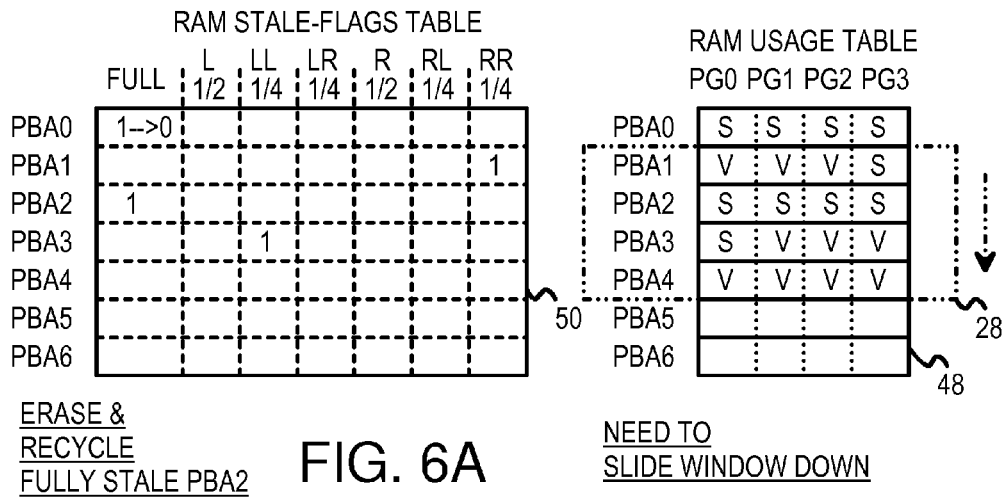

FIGS. 6A-6F highlight changes in the RAM usage table and the RAM stale-flags table. In FIG. 6A, the state of RAM usage table 48 matches that at the end of the example of FIG. 5J. Sliding window 28 is full, and needs to slide down to allow new data to be written into flash memory.

A sliding window routine can be activated to search through RAM stale-flags table 50 to find blocks to erase and valid pages to relocate. The routine scans the full flags in RAM stale-flags table 50 and finds that block PBA2 is full of stale pages, since its stale-full flag is set. Block PBA2 can be added to the recycle FIFO and be erased. Block PBA0 was added to the recycle FIFO earlier and is in the process of being erased, and its full flag is reset from 1 to 0 sometime during the erase process.

Block PBA1 has a stale page at PG3, the right-most quadrant, and thus has its RR quarter-full flag set. Block PBA3 has a stale page at PG0, the left-most quadrant, and thus has its LL quarter-full flag set. Page PBA4 has no valid pages and has no flags set in RAM stale-flags table 50.

Figure 6B:
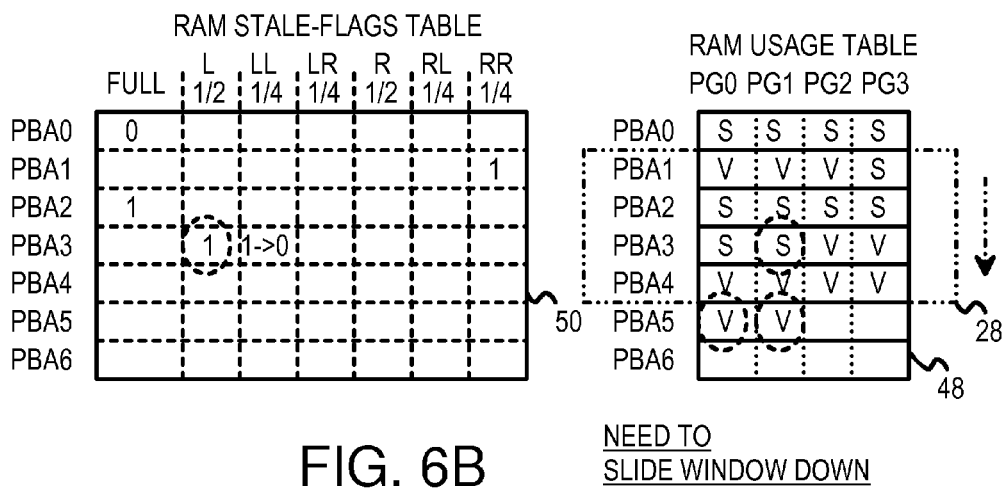

In FIG. 6B, two more new pages are received. Page PBA3, PG1 become stale, while the new data are written to pages PG0, PG1 in block PBA5. This is outside sliding window 28. Sliding window 28 could be enlarged to include block PBA5 if necessary to accommodate the new data pages.

The newly stale page in block PBA1 causes the left half-flag to be set, while the quarter flag is reset. There are now 2 stale pages in this block, and the left half is stale.

Figure 6C:
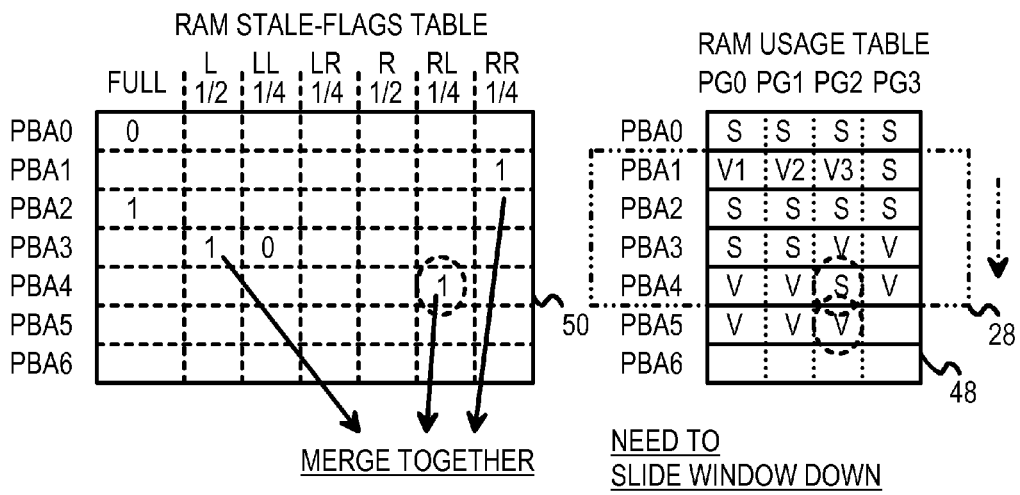

In FIG. 6C, another new page is received. Page PBA4, PG2 become stale, while the new data is written to page PG2 in block PBA5. The newly stale page in block PBA4 causes the right-left quarter-flag to be set.

In one embodiment, the window sliding routine can merge valid pages from several different blocks using the flags in RAM stale-flags table 50. The left-half flag for PBA3, combined with the RR and RL quarter-flags in the right half for PBA1, PBA4, respectively, could be combined to form a fully-stale row. The 3 valid pages in PBA1, the 3 valid pages in PBA4, and the two valid pages in PBA3 could be relocated, allowing these three blocks to be erased.

In another embodiment, valid pages from the top row in sliding window 28 are relocated. Valid pages PG0, PG1, PG2 in PBA1 have data V1, V2, V3. This valid data V1, V2, V3 are copied to the next available free pages at the bottom of sliding window 28. Once the valid data is copied, the pages in PBA1 can be marked as stale and the block erased, allowing sliding window 28 to slide down.

Figure 6D:
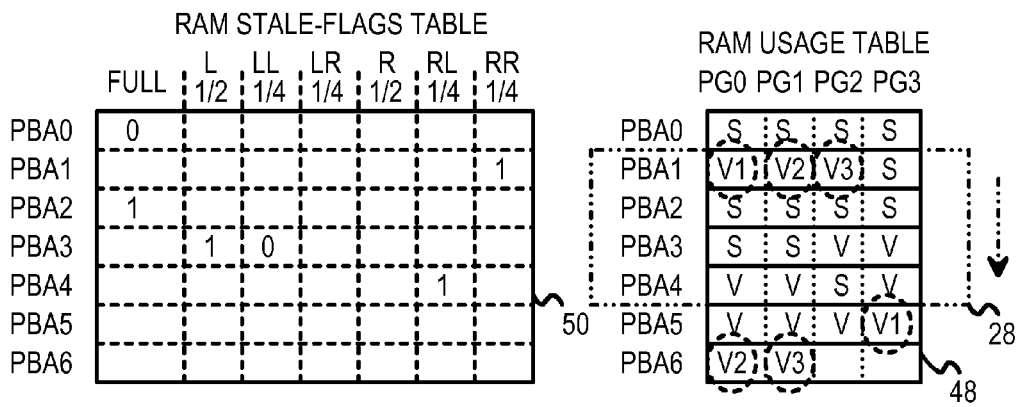

In FIG. 6D, valid pages are relocated. Valid data V1 is copied from page PG0 in PBA1 to page PG3 in PBA5. Valid data V2, V3 are copied from pages PG1, PG2 in PBA1 to pages PG0, PG1, respectively, in PBA6. The valid bits in new blocks PG5, PG6 are set while the valid bits in old block PBA1 are marked stale.

In FIG. 6E, the stale-full flag for old block PBA1 is set. Blocks PBA1 and PBA2 both have their stale-full flags set in RAM stale-flags table 50 and can be added to the recycle FIFO and erased. Sliding window 28 can slide down by two blocks, and now covers blocks PBA3 to PBA6.

In FIG. 6E, after erasing is complete, the valid bits for all pages in blocks PBA0, PBA1, PBA2 are cleared. These valid bits are not in the erased state (not shown). These blocks can be reused once sliding window 28 reaches the last available block and wraps back to first block PBA0.

Figure 7:
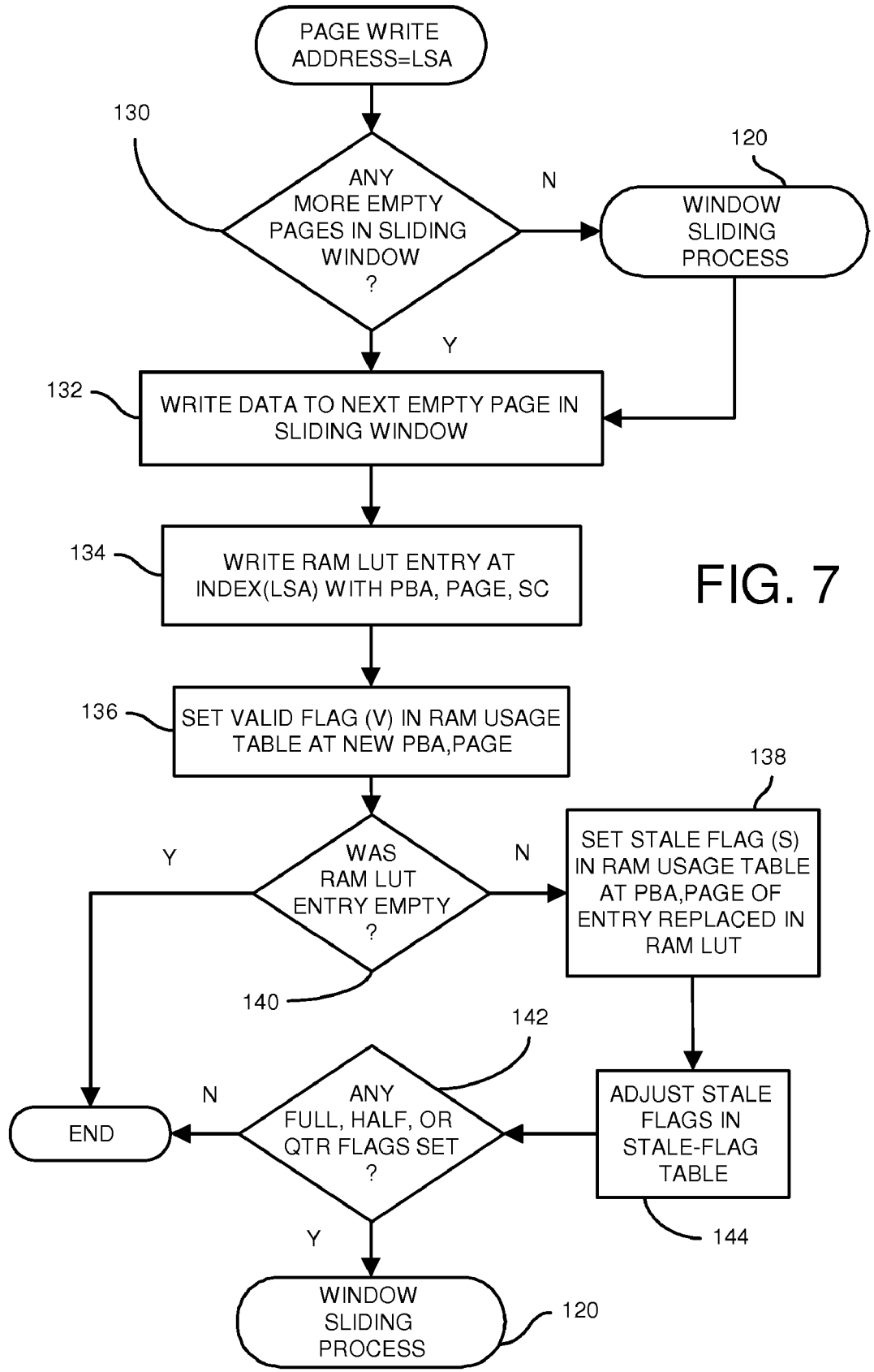
FIG. 7 is a flowchart of a page-write operation.

FIG. 7 is a flowchart of a page-write operation. The host sends a sector of data that is to be written to a page identified by the logical sector address (LSA). The flash memory controller locates the next empty (erased and un-written) page in the sliding window to receive the host data. When there are no more pages in the sliding window, step 130, then window sliding process 120 is called to locate more free pages to write the data to. Alternately, the size of the sliding window may be extended to include the next sequential block.

When there is at least one empty page in the sliding window, step 130, then the new data from the host is written to that empty page in flash memory, step 132. The matching entry in the RAM lookup table is located using the LSA, and the PBA of the empty page that the data was written to, and the page within that block, are written to the matching entry in the RAM lookup table, step 134. The sequential count (SC) is also updated in the entry.

The valid bit for the PBA and page that the data was written to is changed from the erased state to the valid state in the RAM usage table, step 136. Thus the RAM usage table is updated to indicate that the new page is valid. When the matching entry in the RAM lookup table was empty, step 140, then the page-write process can end.

However, when the matching entry replaced another entry in the RAM lookup table, step 140, the replaced entry pointed to another page that now has stale data. The PBA and page from the older entry that was replaced in the RAM lookup table is read, and the valid bit for that older PBA and page is changed from valid to stale in the RAM usage table, step 138.

Since the older PBA now has one more stale page in it, the states of the stale flags in the RAM stale-flags table may change. For example, the older block may now contain only stale pages, and its stale-full flag needs to be set. The valid bits for the older PBA are read from the RAM usage table and examined to determine whether the older PBA is full of stale pages, or has quadrants or halves that are full of stale pages, step 144. When the older PBA has its full flag set, or alternately, and of its full, half, or quarter flags set, step 142, then window sliding process 120 can be activated. Otherwise the page-write process ends.

Figure 8:
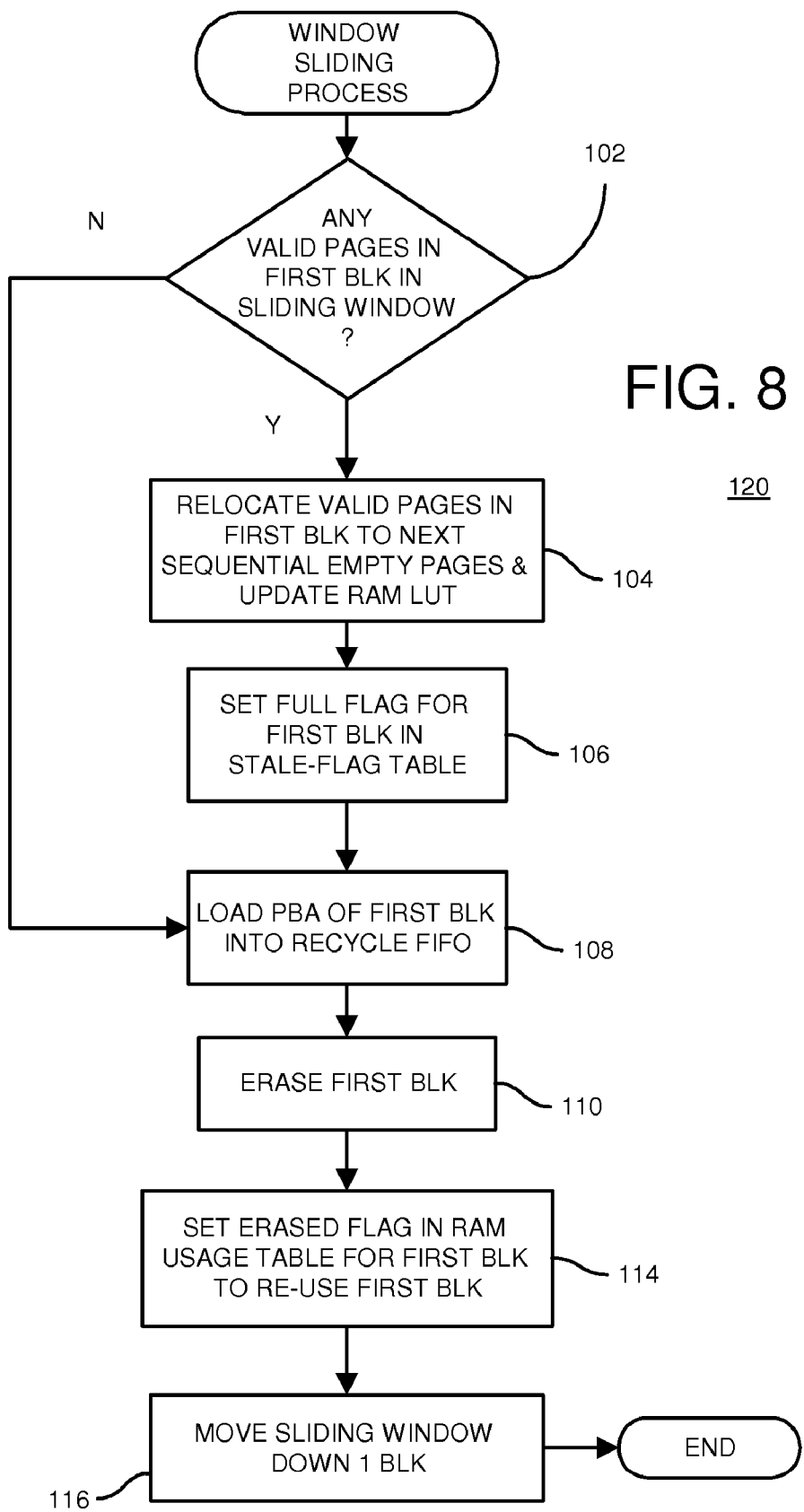
FIG. 8 is a flowchart of a window sliding process.

FIG. 8 is a flowchart of a window sliding process. When window sliding process 120 is activated, it examines the top row of pages in the sliding window, which is the first and oldest block in the sliding window. When the first block contains no valid pages, step 102, then all the pages are stale in that block. The first block can safely be erased, step 110. The PBA for the first page can be added to a recycle FIFO, step 108, such as when other blocks are in the process or being erased. The valid bits for all pages in the first block can be changed from stale to erased in the RAM usage table, step 114. The first block can later be re-used once the sliding window loops back to the first block. The sliding window is moved down one row so that the first block is no longer in the sliding window, step 116. Window sliding process 120 then ends.

When there is one or more valid pages in the first block, step 102, then this valid data must be relocated before the first block can be erased. Otherwise the valid data would be lost. The valid pages in the first block are copied to the next free pages in the sliding window, or just beyond the sliding window, step 104. The matching entries for these valid pages in the RAM lookup table are updated to point to the PBA and pages of the copied data at the end of the sliding window, rather than the PBA of the first block.

After the valid pages have been relocated, the valid pages may be considered stale, since another copy of the data exists at the end of the sliding window. The stale-full flag in the RAM stale-flags table for the first block can be set, step 106. The PBA for the first block can be loaded into the recycle FIFO, step 108, to queue the first block for erasing, step 110.

The valid bits for all pages in the first block can be changed from stale to erased in the RAM usage table, step 114. The first block can later be re-used once the sliding window loops back to the first block. The sliding window is moved down one row so that the first block is no longer in the sliding window, step 116. Window sliding process 120 then ends.

When the first block contains no stale pages, window sliding process 120 can simply move the sliding window down, leaving the valid pages in the first block. The first block could be removed from the pool of erased pages that the sliding window passes through. Thus data that is written in once and not disturbed can be kept in place, while data that is updated is relocated to reduce wasted space in stale blocks.

Figure 9:
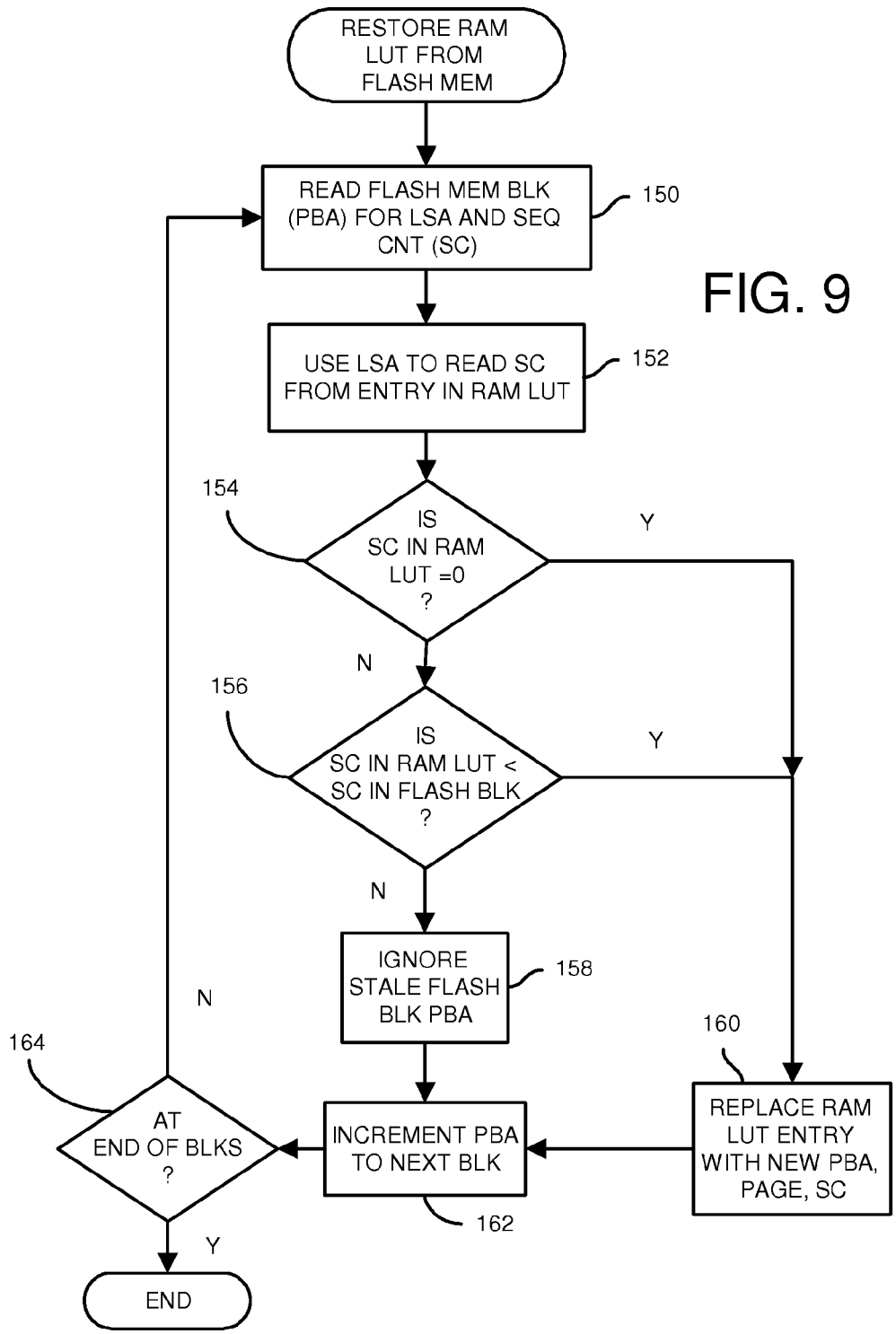
FIG. 9 is a flowchart of restoring the RAM lookup table after a power failure.

FIG. 9 is a flowchart of restoring the RAM lookup table after a power failure. Since the RAM lookup table, RAM usage table, and RAM stale-flags table are stored in volatile memory such as SRAM or DRAM, when power fails the information in these tables is lost. However, the information in the flash memory remains valid.

When power returns, the restore routine is activated. A block in the flash memory is read, step 150, for the LSA and the sequential counts that are stored in overhead bytes in the block. The LSA read from flash is used to find the matching entry in the RAM lookup table, step 152. The sequential count for this entry is read from the RAM lookup table. After power-up, the data in the RAM lookup table is likely in a default state, such as zero. When the sequential count read from the RAM lookup table is zero (or the default state), step 154, then the flash block's PBA can be written to the matching entry in the RAM lookup table, step 160, along with the sequential count read from the flash block and the flash page number(s). The routine can increment to the next flash block, step 162, and if there are more flash blocks to process, step 164, then the routine can be repeated for other flash blocks until all flash blocks have been read, step 164.

When the sequential count in the RAM lookup table is not in the default state, step 154, then the sequential counts from the flash and the RAM lookup table are compared, step 156. When the sequential count read from flash is greater than the sequential count in the RAM lookup table, then the matching entry in the RAM lookup table is replaced using the flash data, step 160. When the sequential count read from flash is less than the sequential count in the RAM lookup table, then the matching entry in the RAM lookup table points to fresher data than in this flash block. The flash data is stale, step 158. The stale flag for this block in the RAM usage table could be set. The routine can increment to the next flash block, step 162, and if there are more flash blocks to process, step 164, then the routine can be repeated for other flash blocks until all flash blocks have been read, step 164.

The restore routine can have a nested loop (not shown) to examine each page within the flash block, and to update each page's matching entry when the page's sequential count is greater than the sequential count in the matching entry.

Alternate Embodiments

Several other embodiments are contemplated by the inventors. For example, the number of pages per block can be more than 4, such as 8, 16, 32, 64, etc. The number of physical blocks in the system can increase, and blocks can be partitioned among the data and overhead pools in various ways and also dynamically. The sector size could vary from the 512-byte sector described. The page size can be 512 bytes, 2K, 4K bytes or higher, such as for multi-level cell flash memory, but the sector size inherited from hard disk drives may remain 512 bytes for compatibility reasons. Other bits may be stored with each page or with each block, such as LRU bits, management or coherency bits, dirty bits, other counters, etc.

Some blocks may be faulty and are removed from the pool of erased blocks that cycle through sliding window 28. Thus sliding window 28 may skip over these faulty pages or blocks. Sliding window 28 does not have to follow a loop of sequential binary block numbers, but could use other sequences, such as gray code loops, ascending or descending values, or any sequence. The sequence could be modified for wear-leveling, bad blocks, or other reasons.

While the flash-memory card has been described as being on a Peripheral Component Interconnect Express (PCIE) bus with a PCIE interface, it also could have a USB interface to a USB bus. Rather than being on a card, the device might be a module or may be located on one or more chips or on several boards or on a motherboard.

Different kinds of flash memory may erase to 0, and only allow writing to 1, not writing from 1 to 0. Some flash memory may allow page erase, rather than whole block erase. Events may occur exactly when described, such as incrementing sequence counters at the start of a new block, or could occur at other times. Valid bits may change to the erased state near by not exactly at the time of physical erasing, such as before or after the actual erase operation. Pipelining, buffering, and other time-shifting operations may be used. Wait states that delay operations may be added, such as when erasing is very slow.

Other incrementing procedures or algorithms could be used, such as counting backwards in binary code, gray code, or using 2's complement, rather than right-shifting zeros. Incrementing can refer to decrementing, and bits could be set to 0 rather than just set to 1, or cleared to 1,1, since inverted bit states or polarities may be used.

Hashing such as modulo remainders could be used to map LSA's to RAM entries in RAM lookup table 40. The RAM entries could store other information, and additional memory or registers could be used to store status or program variables that are useful for the flash-memory card or its software drivers.

The sequential counter or other counters may use a counting order other than binary or gray code. For example, the sequential counter may shift in zeros from the right, then shift in ones from the right, such as in the sequence 11111110, 11111100, 11111000, 11110000, . . . etc. Some values in the sequence may be skipped, such as incrementing from 01111111 to 11111110 by skipping 11111111, which is the erased value. Many sequences and variations are possible.

The counter could contain many more bits, such as 32 bits rather than 8 bits, allowing for counting up to 32 without erasing from 0 to 1. Counting sequences that minimize bit changes from 0 to 1 could be used, with bit changes from 0 to 1 occurring when a new current block is started, perhaps by skipping other values in the sequence. Since old blocks are erased, a large count value may not be needed, as the count could be reset periodically when all block have been erased.

Page order may vary, such as by checking pages 1, 3 first, then checking pages 0,2. Many other sequences may be substituted. Various other steps such as validating data may be added. The flash-memory card may have its own flash-memory array or may use flash memory on another bus, such as on a USB flash card. Some caching operations or other workload could be processed by the host or by another processor such as the I/O processor, and could be partitioned among software, firmware, and hardware. The flash-memory card could be a printed-circuit board (PCB), a smaller plug-in card or device, a device with an external chassis, a board or rack in a larger chassis, or may be integrated with other components or with the host. The data stored may come from one or more hosts, peripheral devices, bus masters, or various other sources.

Various other criteria may be considered when choosing blocks for adding to the sliding window, such as location when blocks are partitioned among buses or physical devices or cards. Additional restriction on choice of the next block can be added, such as limiting the number or location of physical blocks that can map to a particular RAM index. For example, each LSA could be restricted to mapping to only 1 PBA per area. The RAM table may not be needed in some embodiments with restrictions on mapping. Powers of 2 rather than the simplified powers of 10 may be used for the number of RAM entries.

Rather than always relocating valid pages in the first block of the sliding window, first blocks that contain all valid pages could be left in place and the sliding window moved downward. Also, a threshold number of stale pages could be determined. When the first page has less than the threshold number of stale pages, then the valid pages in the first block are not relocated, but remain in place. The threshold number could be adjusted to optimize the tradeoff between wasted space due to stale pages, and relocation overhead. The RAM stale-flags table can be especially useful in determining when the threshold for relocation has been reached.

The RAM usage table and the RAM stale-flags table could have rows for all flash block, or just flash blocks that are in or around the sliding window.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A flash-memory system comprising:
   a flash memory arranged as blocks of multiple pages, wherein pages are written and blocks are erased, wherein individual pages are not individually erasable except by erasing all pages in the block;
   a volatile lookup table having storing mapping entries, wherein a mapping entry stores a logical address of data from a host and a physical block address (PBA) indicating a location of the data within the flash memory;
   a volatile usage table having valid bits for pages in the flash memory, wherein a valid bit for a page in the flash memory indicates a valid state when the page contains valid data, a stale state when the page contains data that has been replaced by newer data stored in a different page in the flash memory, and an erased state when the page has been erased and not yet written with data from the host;
   a sliding window indicating blocks in the flash memory, wherein the sliding window indicates a first block and a last block within the sliding window;
   a flash memory controller that relocates valid pages of data from the first block in the sliding window to the last block in the sliding window to allow the first block to be erased and recycled for later use;
   wherein the valid pages in the first block have valid bits in the valid state in the volatile usage table;
   whereby valid pages in the first block are relocated to allow erasing and recycling of the first block.

2. The flash-memory system of claim 1 wherein stale pages in the first block have valid bits in the stale state in the volatile usage table;
   wherein when the first block contains valid pages and stale pages, the first block is recyclable by erasing all pages in the first block after the valid pages are relocated to the last block in the sliding window;
   wherein recycling the first block containing stale and valid pages reduces wasted space of the stale pages in the flash memory.

3. The flash-memory system of claim 2 further comprising:
   a recycle buffer that stores locations of blocks in the flash memory that are ready for erasing;
   wherein the valid bits in the volatile usage table for pages in blocks stored in the recycle buffer are changed to the erased state when the blocks are erased;
   wherein the flash memory controller updates the valid bit in the volatile usage table for a page being written with host data from the erased state to the valid state.

4. The flash-memory system of claim 3 wherein the flash memory controller advances the sliding window to a new last block and to a new first block when the first block is loaded into the recycle buffer for erasing;
   wherein the flash memory controller sequences the sliding window through a pool of erased blocks in the flash memory in a looping sequence of blocks.

5. The flash-memory system of claim 4 wherein the mapping entries further comprise a page number of a page of data stored in a block at the PBA within the flash memory.

6. The flash-memory system of claim 5 wherein the mapping entries further comprise a sequential count, the sequential count indicating a relative age of the page of data stored at the PBA within the flash memory.

7. The flash-memory system of claim 4 further comprising:
   a volatile stale-flags table that stores stale-full flags that are set for a block when the block contains all stale pages and no valid pages;
   wherein the flash memory controller reads the stale-full flags in the volatile stale-flags table to locate blocks that are ready for erasing.

8. The flash-memory system of claim 7 wherein the volatile stale-flags table also stores stale-half-full flags that are set for a block when the block contains all stale pages in a half-block and no valid pages in the half-block.

9. The flash-memory system of claim 7 wherein the volatile stale-flags table also stores stale-quarter-full flags that are set for a block when the block contains all stale pages in a quarter-block and no valid pages in the quarter-block.

10. The flash-memory system of claim 4 wherein the flash memory comprises multi-level-cell (MLC) flash memory that comprises physical memory cells that each store more than one bit of data.

11. The flash-memory system of claim 10 wherein each page in the flash memory is writeable only once between erases.

12. The flash-memory system of claim 11 wherein the flash memory writes host data to pages in a sequential order of blocks;
wherein out-of-sequence page writing is prohibited by the flash memory.

13. A method for reducing space wasted by stale pages in a flash memory comprising:
maintaining a volatile usage table that has valid bits for pages in blocks in the flash memory by changing a valid bit for a page from an erased state to a valid state when host data from a host is written to the page, and by changing the valid bit from the valid state to a stale state when newer host data having a same logical address as the page storing the host data is written to another page in the flash memory;
erasing all pages in a recycled block and changing valid bits for all pages in the recycled block to an erased state;
writing host data to a next sequential page in a sliding window wherein the next sequential page is a next page in a writing sequence after a page that was a most-recently-written page with prior host data and changing the valid bit for the next sequential page from the erased state to the valid state;
when a first block in the sliding window contains only stale pages having valid bits in the stale state and contains no valid pages having valid bits in the valid state, indicating that the first block is the recycled block ready for erasing and recycling;
advancing the sliding window to include a next block in a sequence after a most-recently-added block in the sliding window, and removing the first block from the sliding window when the first block is indicated as ready for erasing and recycling; and
when first block in the sliding window contains stale pages having valid bits in the stale state and contains valid pages having valid bits in the valid state, copying host data from the valid pages in the first block to next pages in the writing sequence after the most-recently-written page and changing to the stale state the valid bits for the valid pages relocated to the next pages so that the first block contains only stale pages, and indicating that the first block is the recycled block ready for erasing and recycling,
whereby space wasted by the stale pages in the first block are recycled by relocating the valid pages in the first block.

14. The method of claim 13 further comprising:
comparing a number of the stale pages in the first block to a relocation threshold and removing the first block from the sliding window and not relocating the valid pages in the first block when the relocation threshold is not reached and the first block contains valid pages and stale pages.

15. The method of claim 14 further comprising:
receiving a logical address from the host for the host data;
locating a matching entry in a lookup table that matches the logical address;
using an existing block address in the matching entry in the lookup table to locate the valid bit in the volatile usage table to change the valid bit from the valid state to the stale state; and
over-writing the existing block address with a new block address of the next page in the sliding window.

16. The method of claim 15 further comprising:
writing a new sequential count to the matching entry in the lookup table to over-write an existing sequential count, wherein the new sequential count is larger than the existing sequential count.

17. The method of claim 14 further comprising:
setting a half-stale flag in a volatile stale-flags table when a half of a block contains only stale pages and no valid pages.

18. The method of claim 17 further comprising:
setting a quarter-stale flag in a volatile stale-flags table when a quarter of a block contains only stale pages and no valid pages.

19. The method of claim 18 further comprising:
reading the quarter-stale flags and the half-stale flags in the volatile stale-flags table to determine when the relocation threshold has been reached.

20. A flash-memory manager comprising:
multi-level-cell (MLC) flash memory means for storing multiple bits of data per physical flash-memory cell, arranged as blocks of multiple pages, wherein pages are written and blocks are erased, wherein individual pages are not individually erasable except by erasing all pages in the block;
volatile lookup table means for storing mapping entries, wherein a mapping entry stores a logical address of data from a host and a physical block address (PBA) indicating a location of the data within the MLC flash memory means;
volatile usage table means for storing valid bits for pages in the MLC flash memory means, wherein a valid bit for a page in the MLC flash memory means indicates a valid state when the page contains valid data, a stale state when the page contains data that has been replaced by newer data stored in a different page in the MLC flash memory means, and an erased state when the page has been erased and not yet written with data from the host;
sliding window means for indicating blocks in the MLC flash memory means, wherein the sliding window means indicates a first block and a last block within the sliding window means; and
flash memory controller means for relocating valid pages of data from the first block in the sliding window means to the last block in the sliding window means to allow the first block to be erased and recycled for later use;
wherein the valid pages in the first block have valid bits in the valid state in the volatile usage table means;
wherein stale pages in the first block have valid bits in the stale state in the volatile usage table means;
wherein when the first block contains valid pages and stale pages, the first block is recyclable by erasing all pages in the first block after the valid pages are relocated to the last block in the sliding window means;
whereby recycling the first block containing stale and valid pages reduces wasted space of the stale pages in the MLC flash memory means.

* * * * *